Patented Mar. 24, 1942

2,277,046

UNITED STATES PATENT OFFICE 2,277,046

OXIDATION OF MERCUROUS SULPHATE

Karl M. Herstein, Brooklyn, N. Y., assignor to Acrolein Corporation, a corporation of Delaware No Drawing. Application September 27, 1939, Serial No. 296,772

5 Claims. (Cl. 23—117)

This invention relates to the regeneration of reagents containing mercury compounds and more particularly it relates to the regeneration of the mercuric sulphate reagent used in the production of acrolein from propylene gas.

In my co-pending applications Serial No. 221,629 and Serial No. 296,771, I have described processes in which acrolein is produced by the interaction of propylene and a mercuric sulphate reagent. The mercuric sulphate reagent may contain varying proportions of mercuric sulphate, sulphuric acid, and water. Under proper conditions, this reagent will react with propylene to produce acrolein, the mercuric sulphate of the reagent being reduced to mercurous sulphate with the simultaneous production of free sulphuric acid. The overall equation for this reaction is believed to be as follows:

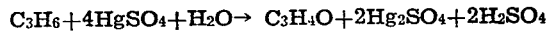

The mercurous sulphate is deposited as a finely divided precipitate. Traces of various organic impurities are produced as a result of side reactions between the propylene and the reagent. The spent reagent thus contains sulphuric acid, a precipitate of mercurous sulphate, and traces of various organic impurities. Some unreacted mercuric sulphate, which is soluble in the reagent, may also be present.

In order to produce acrolein economically from propylene and a mercuric sulphate reagent, it is desirable to regenerate the spent reagent as completely as possible so that it may be re-used in the process and not discarded as a useless product. My invention provides a process which is particularly advantageous for the regeneration of this type of spent reagent.

In accordance with my invention, the spent reagent containing mercurous sulphate and sulphuric acid is regenerated by separating the mercurous sulphate from the reagent, converting sulphuric acid in the reagent into persulphuric acid and then oxidizing the mercurous sulphate originally separated with the persulphuric acid produced. The oxidation reaction is believed to proceed in accordance with the following equation:

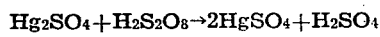

The resulting composition containing mercuric sulphate and sulphuric acid may be reused in the production of acrolein from propylene.

The mercurous sulphate may be separated from the spent reagent by any suitable means, e. g. decantation, filtration, centrifuging, etc.

The sulphuric acid in the spent reagent is advantageously converted into persulphuric acid by electrolytic oxidation. Such oxidation may be carried out with advantage in a diaphragm cell having an anode composed of a material having a high oxygen overvoltage, e. g. platinum. The electrolytic oxidation is advantageously carried out at a temperature of about 15° C. although it may be as high as about 25° C. and as low as about −5° C. The current density is advantageously about two amperes per square centimeter.

The oxidation of sulphuric acid in the spent reagent is advantageously continued until the amount of persulphuric acid produced is substantially stoichiometrically equivalent to the amount of mercurous sulphate to be converted into mercuric sulphate. Where the spent reagent does not contain sufficient sulphuric acid to produce such an amount of persulphuric acid it is desirable to add a suitable quantity of sulphuric acid to the reagent. Persulphuric acid is a somewhat unstable compound and at the temperatures at which it is caused to react with mercurous sulphate it shows some tendency to decompose. Enough persulphuric acid should be produced to allow for any such decomposition. The mass action principle applies to the reaction between persulphuric acid and mercurous sulphate, and for this reason it may be desirable to produce an excess of persulphuric acid to make the subsequent oxidation of mercurous sulphate more complete.

The conversion of mercurous sulphate into mercuric sulphate by the persulphuric acid produced from the reagent may be carried out in any suitable reaction vessel. The temperature of the reaction mixture is advantageously maintained at about 70–100° C. Too high a temperature should be avoided because of the instability of the persulfuric acid.

My invention will be further illustrated by reference to the following example in which a spent reagent resulting from the interaction of propylene with a mercuric sulphate reagent will be used. The spent reagent selected contains about 4.5 parts by weight of mercurous sulphate, about 25.8 parts by weight of sulphuric acid, and about 69.7 parts by weight of water together with a trace of organic impurities. About 500 parts of this reagent are subjected to filtration and about 22.5 parts of mercurous sulphate are recovered. The filtrate is placed in a diaphragm cell having a platinum anode. An electric current having a density of about 2 amperes per square centimeter is then conducted through the solution. The temperature is maintained at about 15° C. during the electrolysis. The organic impurities as well as sulphuric acid will be oxidized. The electrolysis is continued for about one and one-quarter hours after which time about 9.5 parts of persulphuric acid will have been produced. This amount of persulphuric acid is substantially stoichiometrically equivalent to the 22.5 parts of mercurous sulphate previously recovered. The liquor containing persulphuric acid is then removed from the diaphragm cell and mixed with the 22.5 parts of mercurous sulphate. The resulting mixture is heated to a temperature of about 70° C. and kept at about this temperature until the reaction between the mercurous sulphate and persulphuric acid has been substantially completed. This will require about thirty minutes. The resulting composition contains mercuric sulphate, sulphuric acid and water in substantially the proportions suitable for the production of acrolein from propylene.

The process is readily adapted for continuous operation. Mercurous sulphate may be continuously separated from the spent reagent, sulphuric acid may be continuously converted into persulphuric acid and the persulphuric acid produced may be continuously reacted with mercurous sulphate initially recovered to produce a composition containing mercuric sulphate and sulphuric acid.

While my process has been illustrated by reference to the regeneration of the spent reagent resulting from the production of acrolein by the interaction of propylene and a mercuric sulphate reagent, it may of course be applied to the regeneration of compositions containing sulphuric acid and mercurous sulphate produced by other processes wherever it is desired to convert the mercurous compound into the mercuric compound.

I claim:

1. The process of treating compositions containing mercurous sulphate and sulphuric acid which comprises separating the mercurous sulphate from the composition, converting sulphuric acid in the composition into persulphuric acid and treating mercurous sulphate originally separated with the persulphuric acid produced.

2. The continuous process of treating compositions containing mercurous sulphate and sulphuric acid which comprises continuously separating the mercurous sulphate from the composition, continuously converting sulphuric acid in the composition into persulphuric acid and continuously treating mercurous sulphate originally separated with the persulphuric acid produced.

3. The process of treating compositions containing mercurous sulphate and sulphuric acid which comprises separating the mercurous sulphate from the composition, electrolytically oxidizing sulphuric acid in the composition to persulphuric acid and treating mercurous sulphate originally separated with the persulphuric acid produced.

4. The process of treating compositions containing mercurous sulphate and sulphuric acid which comprises separating the mercurous sulphate from the composition, converting sulphuric acid in the composition into persulphuric acid, the amount of persulphuric acid formed being substantially stoichiometrically equivalent to the amount of mercurous sulphate originally separated, and causing said mercurous sulphate to react with the persulphuric acid produced.

5. The process of treating compositions containing mercurous sulphate and sulphuric acid which comprises separating the mercurous sulphate from the composition, electrolytically oxidizing sulphuric acid in the composition to persulphuric acid, the amount of persulphuric acid formed being substantially stoichiometrically equivalent to the amount of mercurous sulphate originally separated, and causing said mercurous sulphate to react with the persulphuric acid produced.

KARL M. HERSTEIN.